United States Patent [19]

Laymon et al.

[11] Patent Number: 4,628,613
[45] Date of Patent: Dec. 16, 1986

[54] BEND DETECTOR FOR A PIPELINE PIG

[75] Inventors: Dwane O. Laymon, Tulsa; James M. Berry, Owasso, both of Okla.

[73] Assignee: Electronic Diggins Systems, Inc., Tulsa, Okla.

[21] Appl. No.: 818,219

[22] Filed: Jan. 13, 1986

[51] Int. Cl.[4] ............................ G01B 7/04; G01B 7/28
[52] U.S. Cl. ................................. 33/544; 33/141 G; 33/141.5
[58] Field of Search ............... 33/1 N, 141 G, 141.5, 33/178 F, 534, 544

[56] References Cited

U.S. PATENT DOCUMENTS

| 3,128,554 | 4/1964 | Borden | 33/534 |
|---|---|---|---|
| 3,496,644 | 2/1970 | Short | 33/544 |
| 3,862,497 | 1/1975 | Vernooy et al. | 33/141 G |
| 3,882,606 | 5/1975 | Kaenel et al. | 33/141 G |
| 3,886,665 | 6/1975 | Lowen | 33/544 |
| 3,968,568 | 7/1976 | Jackson | 33/141 G |
| 4,247,985 | 2/1981 | Boyle | 33/178 F |
| 4,457,073 | 7/1984 | Payne | 33/178 F |

Primary Examiner—Richard R. Stearns
Attorney, Agent, or Firm—William S. Dorman

[57] ABSTRACT

A bend detector for use on a pipeline pig assembly comprising a front pig element and a rear pig element pivotally connected to the front pig element by the bend detector; the front pig element having a longitudinally disposed housing with a forward drive cup for driving the assembly by the flow of a fluid through a pipeline system, the rear pig element having a longitudinally disposed housing axially supported in the pipeline, a plurality of odometer wheels radially affixed to the housing of the rear pig element for determining the distance traversed by the assembly through the pipeline system; the bend detector comprising a universal joint having a pair of yoke members pivotally connected to a central member about a pair of mutually perpendicular axes, each of the yoke members having a yoke and a collar, mounting plates for attaching the collars to the front pig element and the rear pig element, respectively, the central member being bored out for receiving a longitudinal hollow sleeve and a central opening in each of the collars thereby forming an axially aligned passageway with the hollow sleeve, a cable received in the passageway and having its rear end anchored to the rear mounting plate, the forward end of the cable being connected to an actuator shaft, the actuator shaft being connected to a stylus for recording a bend along the pipeline system, whereby traversing a bend causes the front pig element to pivot with respect to the rear pig element thereby exerting a pull on the cable causing the actuator shaft to move longitudinally rearward.

8 Claims, 8 Drawing Figures

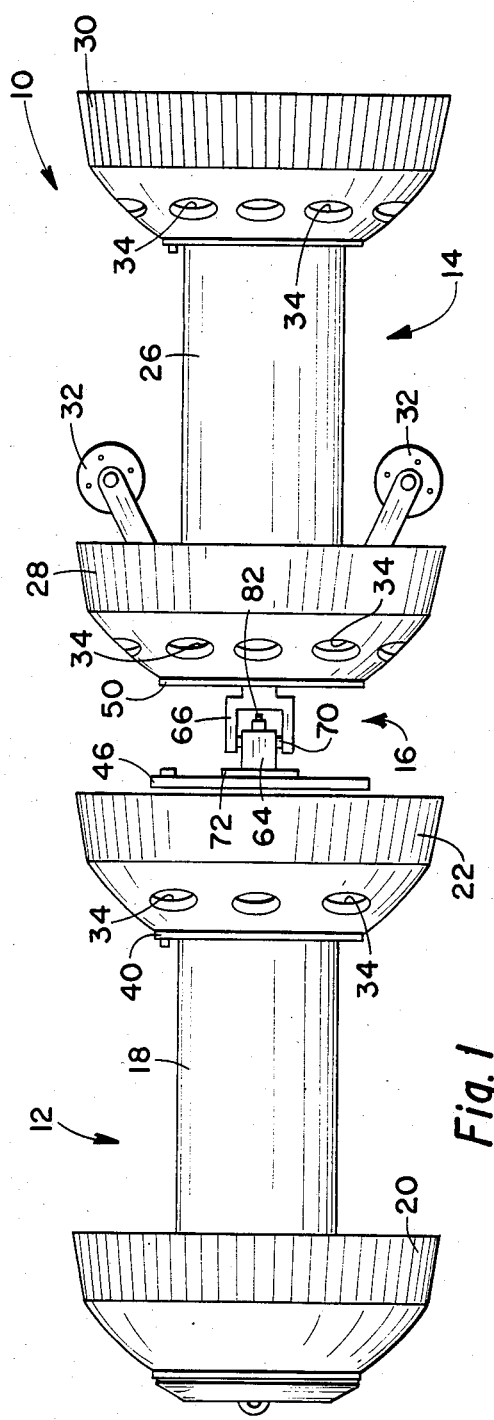
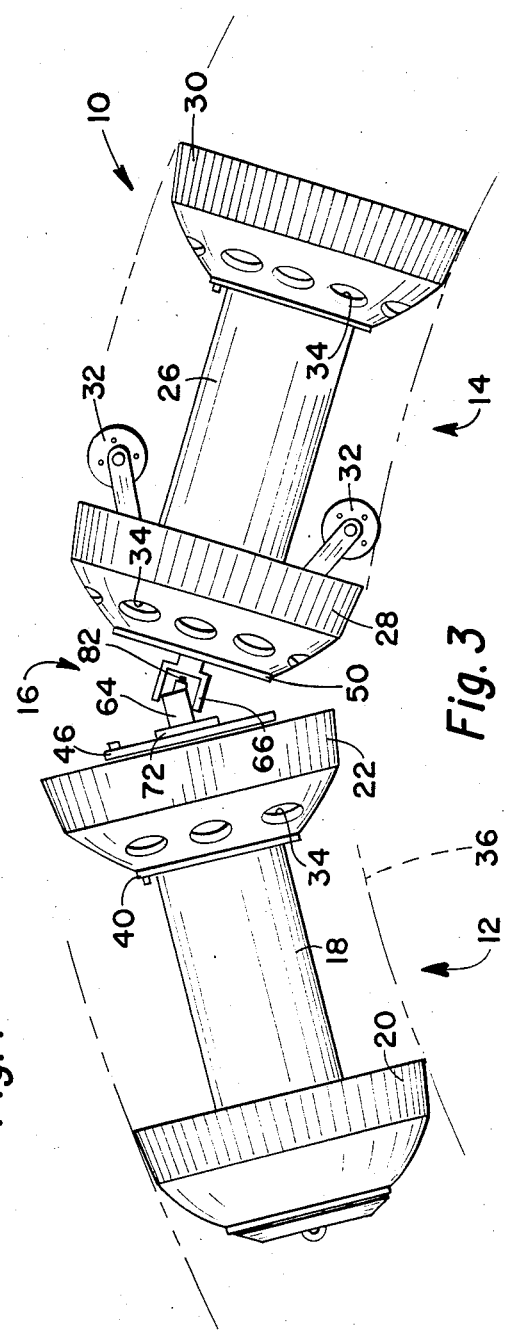
Fig. 1
Fig. 3

BEND DETECTOR FOR A PIPELINE PIG

BACKGROUND OF THE INVENTION

1. Field of the Invention

The present invention relates to bend detector used to map out a pipeline system conveying materials such as oil, natural gas, water and the like. More particularly, the present invention relates to a bend detection apparatus used in conjunction with a pipeline pig assembly.

2. Prior Art

When pipeline systems are laid, most of the necessary bends are provided by manufactured or standard pipe elbows. Slight bends or elbows are usually generated while the pipeline is being laid. However, older pipeline systems generally do not have alignment sheets showing the locations of the standard elbows. On the newer pipeline systems, any repairs that have been made may render a current alignment sheet either incomplete or inaccurate. Precise location of any sharp bend is necessary before various maintenance operations, such as the use of corrosion tools, can be initiated.

There are three general types of standard bends or elbows commonly used for pipeline systems. The sharpest bend is a 90° 1½ radius bend, wherein the pipe curves 90° along an arc whose radius is 1½ times the diameter of the pipe. The other two bends are a 90° 3 radius bend and a 45° 1½ radius bend. More shallow bends can be made on site during the laying of the pipeline.

Pipeline caliper pigs used to inspect pipeline systems are well known. These pipeline pigs are used to detect ovality, serious dents and the like within the interior surface of the pipeline. However, some pipeline pigs and various curvature sensing apparatus are unable to negotiate the sharp bends of factory elbows.

A preliminary search was conducted and the following prior art patents were uncovered:

| U.S. Pat. No. | Patentee | Issue Date |
| --- | --- | --- |
| 3,496,644 | Short | Feb. 27, 1970 |
| 3,718,9781 | Van Koevering et al. | March 6, 1973 |
| 3,755,908 | Ver Nooy | Sept. 4, 1973 |
| 3,780,442 | Gresho | Dec. 25, 1973 |
| 3,789,511 | Groom et al. | Feb. 5, 1974 |
| 3,821,856 | Rapp | July 2, 1974 |
| 3,882,606 | Kaenal et al. | May 13, 1975 |
| 3,886,665 | Lowen | June 3, 1975 |

A pipeline survey vehicle is disclosed in the patent to Van Koevering et al. A motor propelled vehicle is inserted into a pipeline for sensing deflection in a vertical plane. The Van Koevering vehicle is an essentially bullet-like sled with a gravity operated steering means. A bend is detected by means of a plurality of gauge elements which come into contact with the interior surface of the pipeline.

A standard pipeline caliper pig is disclosed in U.S. Pat. No. 3,755,908 to Ver Nooy. The caliper pig is inserted into a pipeline to locate deviations along the interior of the pipe such as dents, ovality and the like.

U.S. Pat. No. 3,789,511 to Groom et al., an apparatus for sensing a curvature in a conduit is disclosed. The Groom patent is used to determine the curvature and strain of a pipeline as it is being laid on marine bottoms. This apparatus comprises a pair of pivotally interconnected rigid components which are subsequently connected to a traction unit which pulls the apparatus through the conduit. Strain gauges are used in conjunction with a rod which passes through the pivotal interconnection to determine the curvature of the pipeline.

A method and apparatus for measuring curvature and variations in pipelines is disclosed in U.S. Pat. No. 3,882,606 to Kaenel et al. The Kaenel apparatus comprises an instrumented pig carrying an array of sensing wheels. As the pig travels down a length of the pipeline, the rotation of the sensing wheels is encoded as a function of the axial distance traveled.

A monitoring apparatus for measuring the varying radii of curvature along the axis of a bore is disclosed in U.S. Pat. No. 3,886,665 to Lowen. The monitoring apparatus comprises an elongated or tubular body member having a roller assembly mounted at each end. The Lowen apparatus is used for indicating the length of the offset over the chord length.

In light of the above, and as will more fully appear hereinafter, the prior art does not disclose the means for detecting bends in a pipeline in the manner disclosed and claimed in the present invention. No prior art device discloses an apparatus used in conjunction with a pig assembly that is system propelled. No prior art patent discloses a bend detector having a broad range of maneuverability and capable of traversing through abrupt bends without buckling in the pipeline.

SUMMARY OF THE INVENTION

An object of the present invention is to provide a pipeline pig for locating and recording manufactured bends in a pipeline system. Another object of the present invention is to provide a pig assembly to detect field generated bends whose angles are too sharp for the passage of servicing tools. A further object of the present invention is to provide a mechanical bend detection apparatus that provides accurate and consistent readings.

It is contemplated that the bend detector of the present invention can be used simultaneously with a gauging system or detector in which case the two detectors can have drums which are synchronized from the same odometer. Therefore, it is a still further object of the present invention to offer a benchmark system which will provide footage correlations between bends and line anomalies.

The present invention comprises a pair of pipeline pigs pivotally connected to each other in a tandem relationship. Each pig comprises a central body having hemispherical cups attached to the front and rear portions of the body. The forward pig is provided with a circular metal plate attached to its rear end behind the rear cup. The rear pig is also provided with a circular metal plate attached to its front end ahead of and adjacent the front cup.

The pivotal connection of the two pigs comprises a universal joint having two yoke members wherein the yoke portions themselves are pivotally interconnected to a central member so as to oscillate about a pair of mutually perpendicular axes lying in a plane generally perpendicular to the axis of the pipeline. These two mutually perpendicular axes are defined by pivot pins which are rigidly connected together to form a cross. The ends of the yoke members opposite from the ends which are connected to the central member are defined as collars terminating in flanges. The flanges of the yoke members are attached to metal plates on the pigs. The collars and the central member have been bored out to form an axially aligned passageway. The central member has been provided with a hollow sleeve that is received in the central bore thereof. The innermost ends of the holes in the collars are provided with teflon (or similar plastic) inserts.

A plastic wrapped cable passes through the teflon inserts and is anchored at one end to the rear plate attached to the rear pig. The other end of the cable is attached to an arm which is connected to an actuator shaft which operates a stylus. The cable is tautly anchored to the rear plate resulting in pull areas at the ends of the hollow sleeve. These pull areas refer to the bending action of the cable against the sleeve ends. A pull exerted by the cable causes the actuator shaft to move longitudinally rearward.

When the pig assembly goes around an internal bend, the sleeve rotates against the cable as the forward pig pivots with respect to the rear pig. This pull action exerted on the cable causes the stylus to move to the right (in reference to the drawings) against a recording drum. The movement of the stylus is registered as a deflection on a chart and will indicate the degree of the bend. A sharper bend, such as a 90° 1½ radius length, would leave a longer recording mark than a less sharp bend. Slight bends may or may not be registered. A longer sleeve will register smaller bends.

BRIEF DESCRIPTION OF THE DRAWINGS

FIG. 1 is a side elevational view of a pipeline pig assembly constructed in accordance with the present invention;

FIG. 3 is a side elevational view of the pig assembly of FIG. 1 shown as transversing through a bend in a pipeline system;

DETAILED DESCRIPTION OF THE PREFERRED EMBODIMENTS

Figure 2:
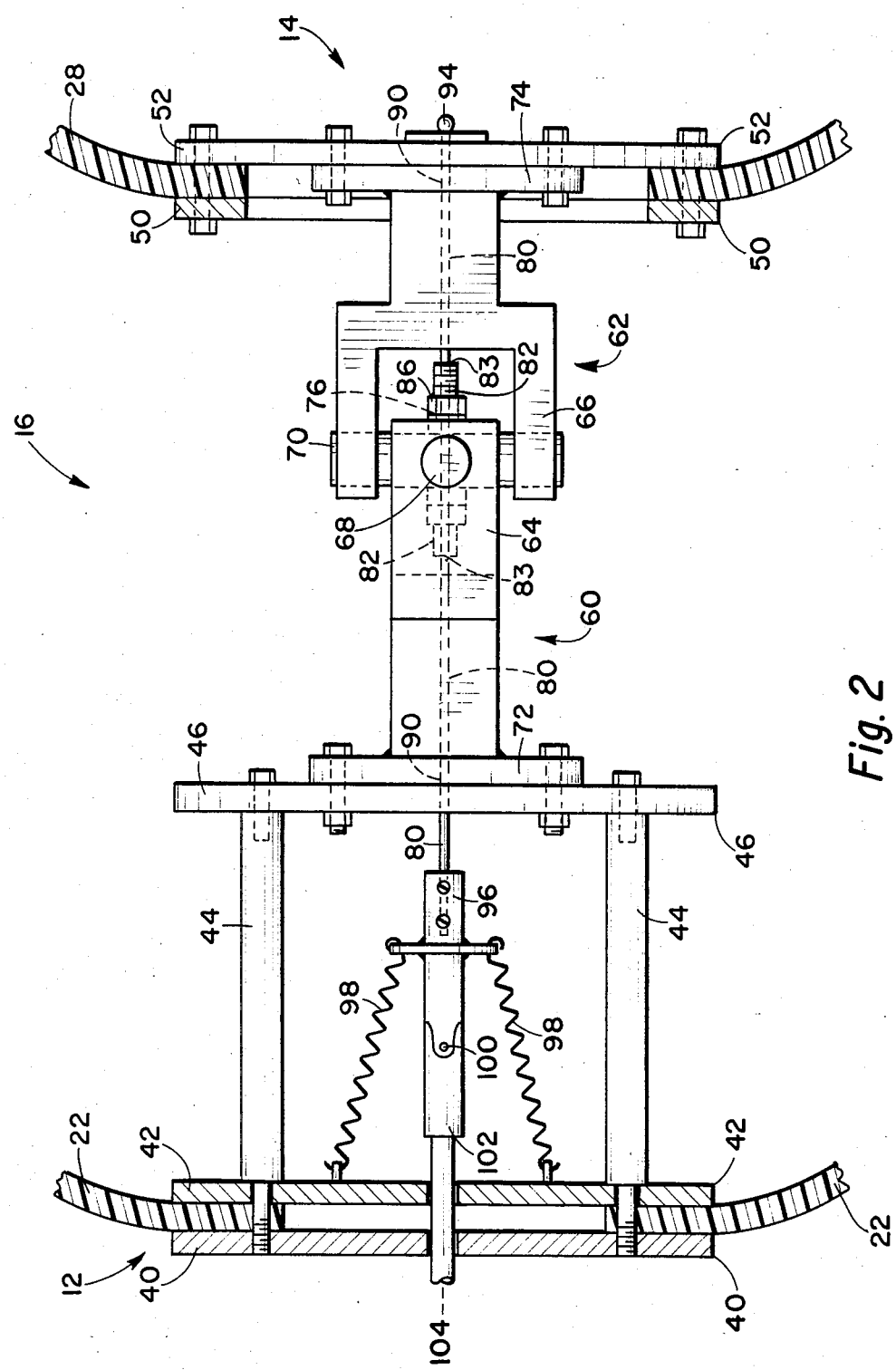
FIG. 2 is an enlarged side elevational view of the bend detector apparatus of the present invention.

Referring to the drawings in detail, FIGS. 1 and 3 show a pipeline pig assembly 10 which includes the bend detector of the present invention. Pig assembly 10 comprises a forward pig element 12 and a rear pig element 14 which are pivotally interconnected at 16 in a tandem relationship. The pivotal interconnection 16 forms a portion of the bend detector whose details will be disclosed hereinafter. The forward pig 12 comprises a cylindrical central body or housing 18, which is longitudinally disposed, having a forward drive cup 20 attached to to its front end and a rear cup 22 attached to its rear portion. The forward cup is necessary for propelling the pig assembly through the pipeline; however, the rear cup is principally to support the central body 18 in a substantially axial position.

The rear pig 14 also comprises a cylindrical central body 26 having a forward cup 28 and a rear cup 30. Cups 20, 22, 28 and 30 are essentially hemispherical in shape and constructed of plastic or similar material, such as urethane, rubber, neoprene or other similar flexible material. The cups 28 and 30 on the rear pig element 14 are provided essentially to support the rear pig element in a substantially axial position and need not necessarily be cups as such.

The rear pig 14 is also provided with a pair of odometer wheels 32 disposed directly behind forward cup 28 and extending radially outward to contact the interior surface of a pipeline section 36. The odometer wheels 32 are connected to recording means (not shown) housed in the interior of housing 18 and are used to determine the distance traveled by pig assembly 10 through the pipeline system.

Although housings 18 and 26 are shown as cylindrical central bodies, the operation of the pig assembly 10 is not limited to the above shapes or locations in the pipeline section. Pig assembly 10 is system propelled; in that, the assembly is inserted into a pipeline system and is moved through the pipeline by means of drive cup 20. As shown, the drive cup is solid (imperforate) whereas the other cups 22, 38 and 30 are provided with a plurality of holes or bypass ports 34. The cups 22, 28 and 30 provide a means for axially supporting the pig elements 12 and 14 in a pipeline 36. The bypass ports 34 allow fluid to pass through the other cups and into the drive cup 20 thereby propelling assembly 10 through the pipeline 36. The bypass ports also eliminate the excess friction (generally caused by fluid pressure pushing the cup material outwardly against the pipe wall) between the surface of the pipeline and the cups 22, 28 and 30 thereby preventing buckling of pig assembly 10 in the pipeline 36.

Referring now to FIGS. 1–5, the rear cup 22 is disposed between a front mounting flange 40 and a rear mounting flange 42. The forward pig element 12 is provided with a circular metal mounting plate 46 which is connected to the rear cup 22 by means of a plurality of studs 44. The front ends of studs 44 are bolted or threadably connected to mounting flanges 40 and 42, and the rear ends of the studs are bolted to mounting plate 46.

The front cup 28 of the rear pig 14 is also disposed between a pair of mounting flanges 50 and 52. The mounting flange 52 serves as a rear mounting plate, whose purpose will be disclosed hereinafter.

As best shown in FIGS. 2, 4, 5, 6, and 7, the bend detector 16 (which is the pivotal connection of the two pigs 12 and 14) comprises a universal joint having two yoke members 60 and 62 having their yoke portions 64 and 66 pivotally interconnected by means of a central member 69 which consists of two pivot pins 68 and 70 which are rigidly connected to each other in the form of a cross. The yoke flange or collar 72 of member 60 is bolted to the plate 46 of the forward pig. The yoke flange or collar 74 of member 62 is bolted to the rear mounting plate 52 of the rear pig.

Referring to FIGS. 2, 4, 5, 6, and 7, the universal joint is provided with an axially aligned passageway 76 which is bored substantially at right angles through the center of the cross 69 formed by the pivot pins 68 and 70 for receiving a plastic wrapped cable 80. The pivotal connection, formed by the pins 68 and 70, has thus been bored out for receiving a hollow rod or sleeve 82 in the passageway 76. The cable 80, therefore, actually passes through the sleeve 82. The ends of the sleeves extend at right angles to the plane of the pivot pins. Sleeve 82 is provided with a pair of cover nuts 86 at each end for securing it to the joint. The yoke collars 72 and 74 have each been provided with central openings 90 which form the ends of the cable passageway. The central openings 90 have been provided with teflon inserts 92.

Figure 4:
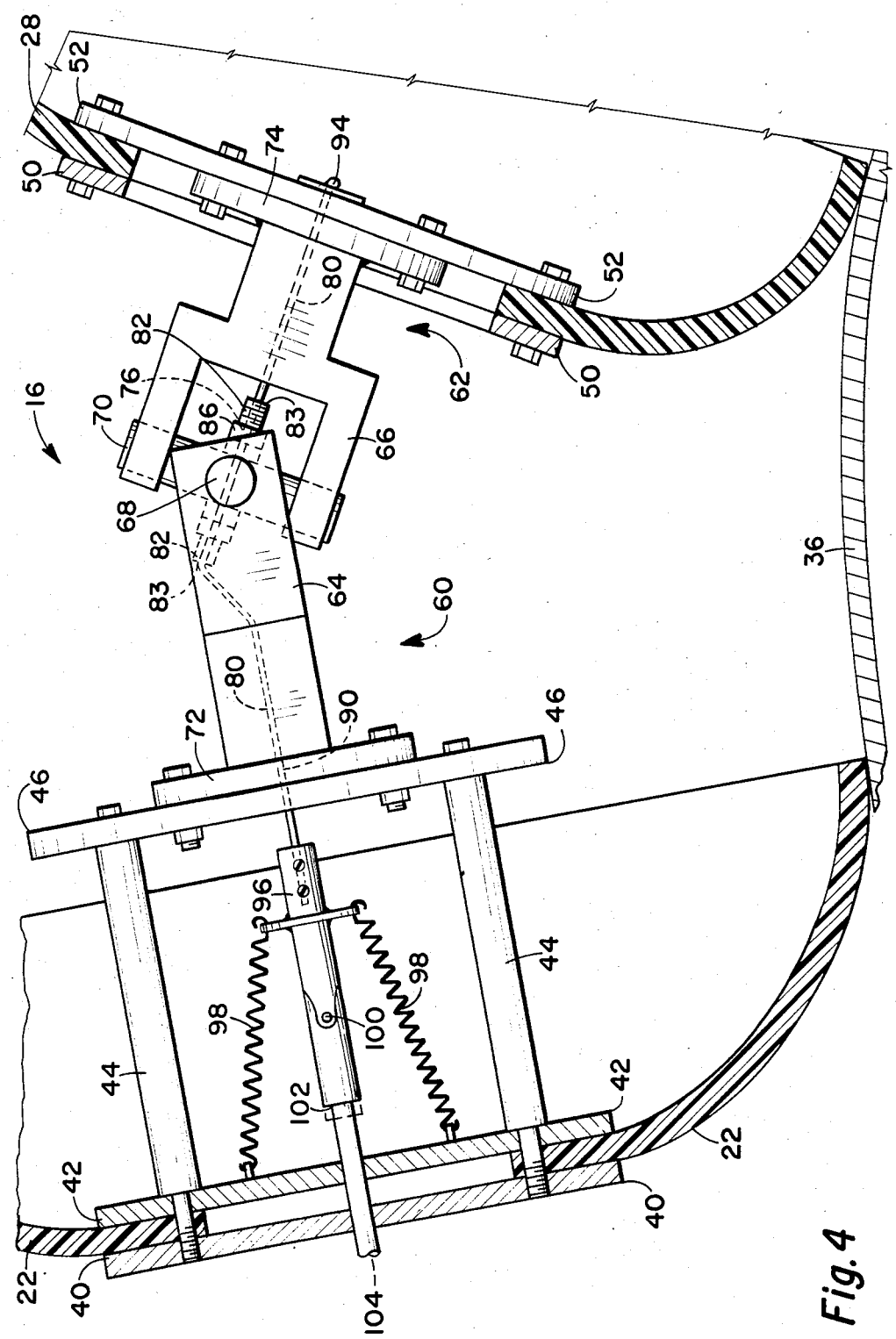
FIG. 4 is an enlarged view of FIG. 3 showing the details of the bend detector.
Figure 5:
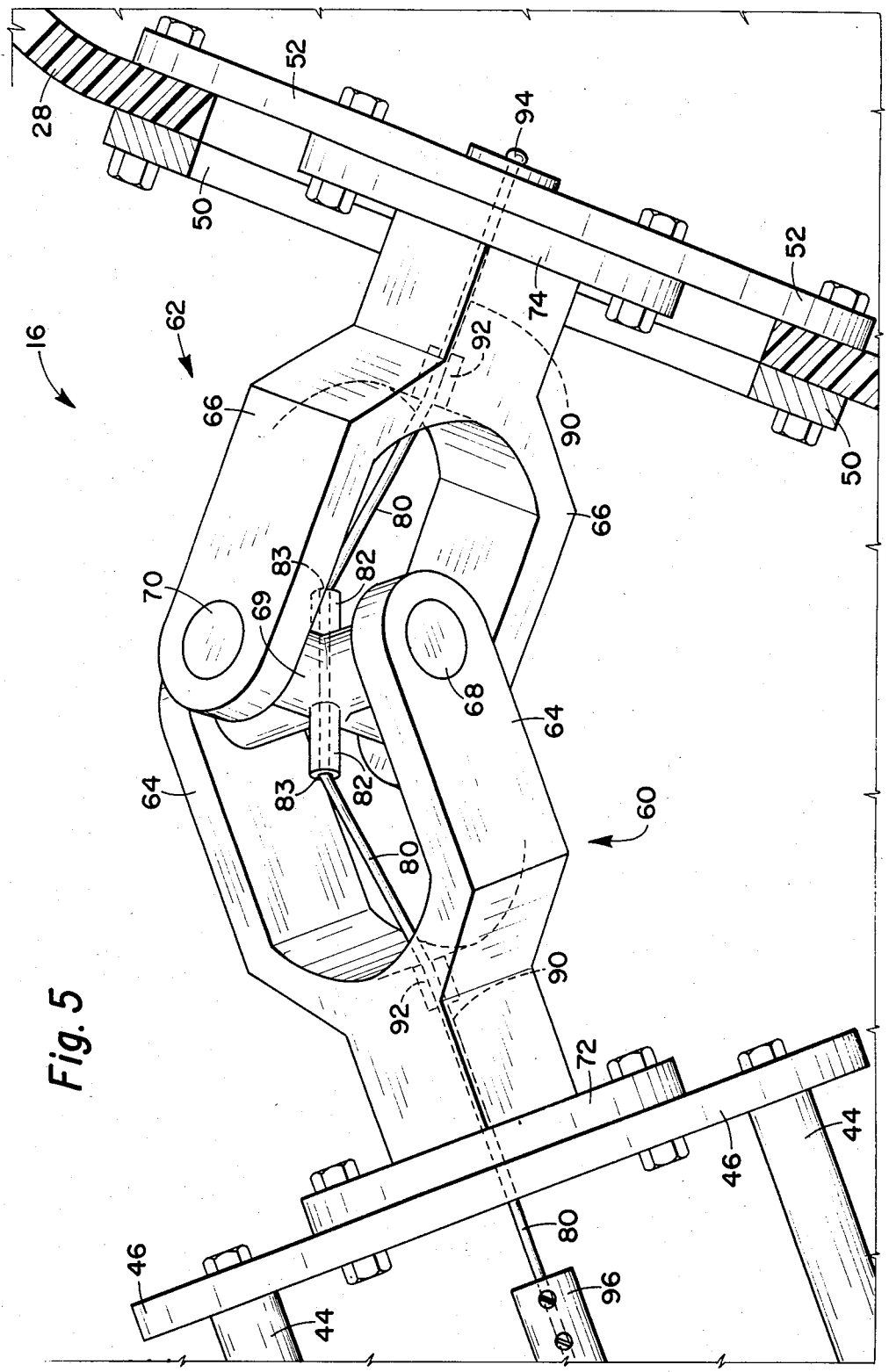
FIG. 5 a further enlarged view of the bend detector similar to that shown in FIG. 3 but representing the relative positions of the elements when traversing a bend which is not in a horizontal or vertical plane.
Figure 6:
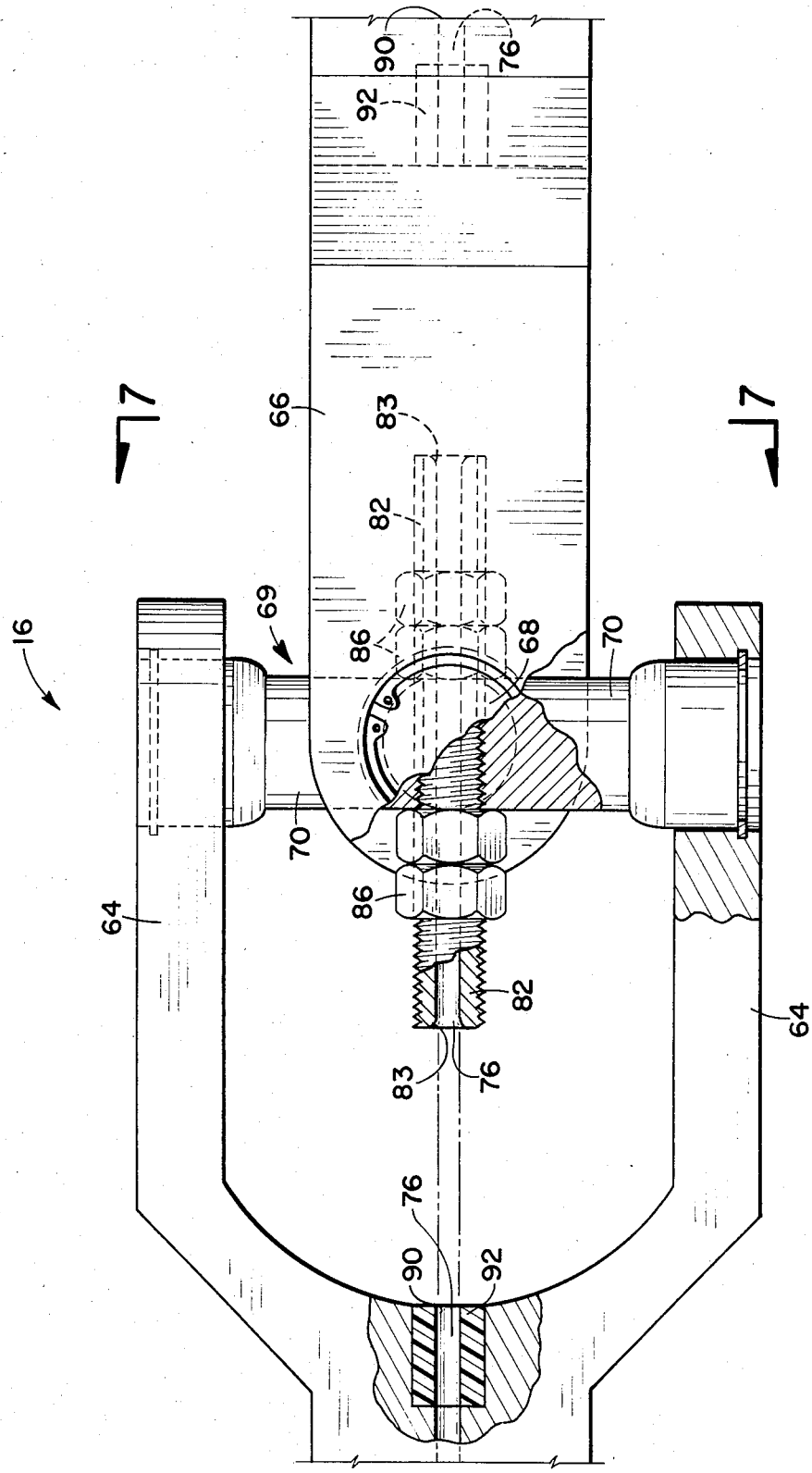
FIG. 6 is a side elevational view of the universal joint embodied in with the present invention showing certain parts being cut away.

As shown, the cable 80 passes through inserts 92 and is firmly anchored at one end to the mounting plate 52 at a point 94 (FIGS. 2, 4 and 5). The other end of the cable is tautly attached to an arm 96 in order to eliminate any slack in cable 80 as it passes through the universal joint. The arm 96 is provided with a plurality of anchor or return springs 98 attached to the mounting flange 42. The arm is pivotally connected at 100 to an actuator shaft 102 which operates a stylus rod 104. The pivotal connection 100 is merely for the sake of convenience and has no function in the present invention other than as a connection.

The tautness of cable 80 results in a "pull areas" at the ends 83 of the sleeve 82. As best shown in FIG. 5, the pull areas refer to the turning action of the sleeve against the cable 80 when the forward pig 12 pivots or turns with respect to the rear pig 14. The combination of the taut cable 80 and the sleeve 82 changes the pivot axis of a common universal joint to a type of lever having two possible pivot points at its ends 83. (One pivot point in FIG. 4 and two pivot points in FIG. 5).

As best shown in FIGS. 3 and 4, the forward pig 12 turns or pivots with respect to rear pig 14 as the entire pig assembly goes around an internal bend in the pipeline 36. A pull exerted by the cable 80 pulls back arm 96 thereby moving the actuator shaft 102 and stylus rod 104 longitudinally rearward. The above pull causes a stylus (not shown but mounted at the end of stylus rod 104) to move to the right against a recording drum (not shown) housed inside the housing 18 of the forward pig element 12. After the pig assembly 10 passes completely through a bend, the springs 98 assists in returning arm 96 back into the position shown in FIG. 2.

Figure 8:
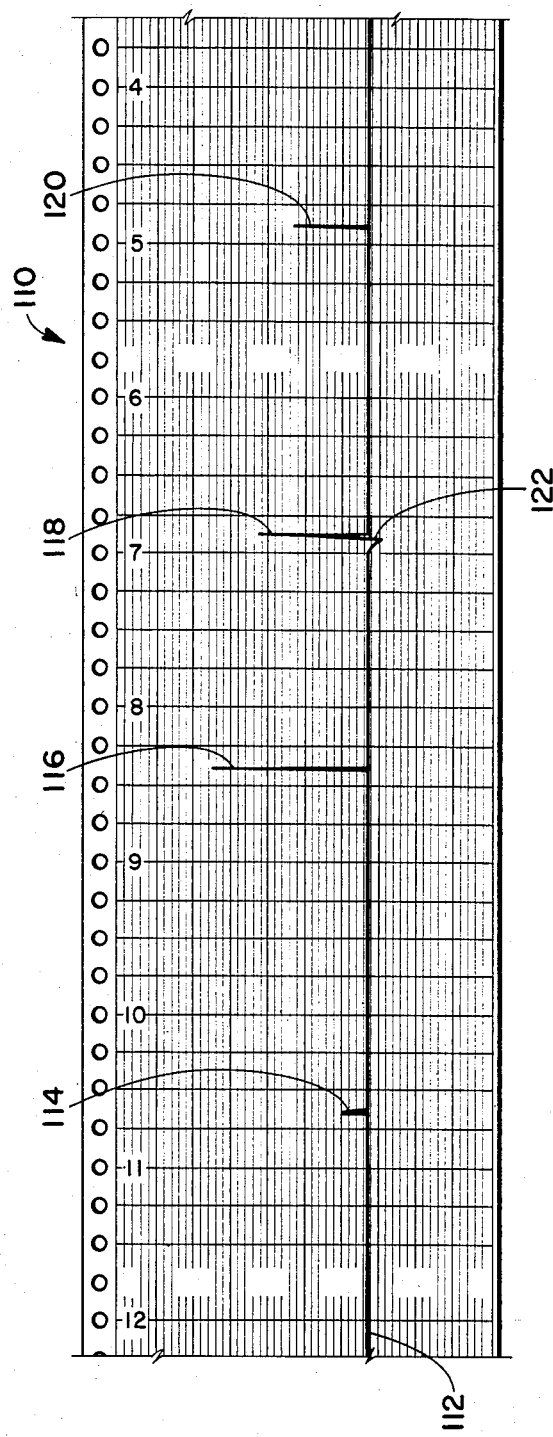
FIG. 8 is a portion of a typical bend detection chart made by the device of the present invention.
Figure 7:
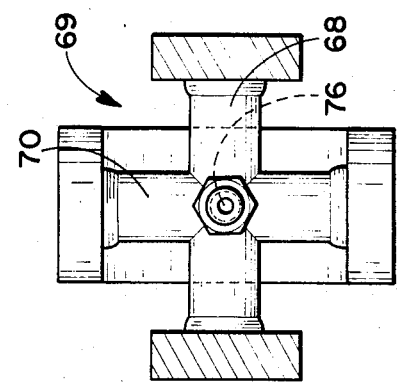
FIG. 7 is a cross-sectional view (on a reduced scale) taken along section line 7—7 of FIG. 6.

Referring to FIG. 8, a portion of a chart 110 is shown that has been produced by the action of the stylus 104 against the internal recording drum. A straight line 112 shows the distance traveled through pipeline 36 as recorded by odometer wheels 32. The first vertical line 114 indicates a relatively shallow bend such as though generated in the field during the laying of the pipeline 36. The second vertical 116 indicates a 90° 1½ radius length manufactured bend and the third vertical line 118 indicates a 90° 3 radius length bend. The last vertical line 120 indicates a 45° 1½ radius length bend.

A modification (not shown) of the passageway 76 provides a means for indicating whether the bend is a right turn or a left turn. The passageway is bored horizontally through the central area 69 so that it is 5° (or some other small angle) off to the left or the right from a true longitudinal axis. The above 5° variation creates a preloaded tension on the cable which will not show up on the chart when the pig assembly is traversing a straight section of pipeline. Assuming, for example, that the angular offset is towards the left (counterclockwise), when the pig assembly goes through a right turn bend, the cable 80 continues to be taut and the deflections will be the same as shown at lines 114, 116 and 118. However, if the pipe goes through a left turn bend, this action initially tends to create a slight slack (not shown) in the cable 80 which causes the springs 98 to pull the stylus towards the left so as to produce a slight dip 122 in straight line 118. Thus, the occurance of dips 122 represent left turn bends, and those without dips represent right turn bends.

What is claimed is:

1. A bend detector for use on a pipeline pig assembly; said pipeline pig assembly comprising a front pig element and a rear pig element pivotally connected to each other by said bend detector, said front pig element having a longitudinally disposed housing with means for driving said pipeline assembly by the flow of a fluid through a pipeline system, said rear pig element having a longitudinally disposed housing with means for axially supporting said housing in said pipeline system; means for determining the distance traversed by said pipeline pig assembly through said pipeline system; said bend detector comprising a universal joint having a pair of yoke members being pivotally interconnected to a central member so as to oscillate about a pair of mutually perpendicular axes lying in a plane generally perpendicular to the axis of the pipeline, each of said yoke members having a yoke and a collar, means for mounting each said collar to said front pig element and said rear pig element, respectively, said central member being provided with a substantially longitudinal bore for receiving a hollow sleeve, a central opening in each said collar thereby forming an axially aligned passageway with said hollow sleeve, a cable received in said passageway and having its rear end anchored to said mounting means on said rear pig element, the forward end of said cable connected to an actuator shaft for a stylus for recording a bend along said pipeline system, whereby when said pig assembly traverses a bend, said front pig element will pivot with respect to said rear pig element thereby pivoting said sleeve relative to said passageway and thereby exerting a pull on said cable causing said actuator shaft to move longitudinally rearward; thereby indicating the location and degree of said bend.

2. A bend detector for use on a pipeline pig assembly as set forth in claim 1 wherein said means for determining the distance traversed comprises a plurality of odometer wheels attached to the housing of said rear pig element and extending radially therefrom to contact the interior surface of said pipeline.

3. A bend detector for use on a pipeline pig assembly as set forth in claim 1 wherein said means for driving said pipeline assembly comprises an imperforate hemispherical cup affixed to the forward end of said housing of said front pig element.

4. A bend detector for use on a pipeline pig assembly as set forth in claim 1 wherein said means for mounting each said collar comprises a pair of mounting plates, one of said mounting plates being affixed to the rear portion of said housing of said front pig element and the other one of said mounting plates being affixed to the front portion of said housing of said rear pig element.

5. A bend detector for use on a pipeline pig assembly as set forth in claim 1 and being further characterized by said hollow sleeve having its ends extending from said central member at right angles thereto, whereby said sleeve turns against said cable as said front pig element pivots with respect to said rear pig element thus resulting in pull areas at said ends of said sleeve.

6. A bend detector for use on a pipeline pig assembly as set forth in claim 1 and being further characterized by said bend detector having means for determining the direction of said bend.

7. A bend detector for use on a pipeline pig assembly as set forth in claim 6 wherein said means for determining the direction comprises a sloped passageway being bored horizontally through said central member at a small angular offset from a true longitudinal axis, said sloped passageway tending to create a slack in said cable when said assembly turns towards the direction of the offset in said sloped passageway.

8. A bend detector for use on a pipeline pig assembly as set forth in claim 7 wherein said small angular offset is approximately 5° to 10° off from the true longitudinal axis.

* * * * *

UNITED STATES PATENT AND TRADEMARK OFFICE
CERTIFICATE OF CORRECTION

PATENT NO. : 4,628,613
DATED : December 16, 1986
INVENTOR(S) : Dwane O. Laymon, et al It is certified that error appears in the above-identified patent and that said Letters Patent is hereby corrected as shown below:

On the title page, item [73] should read as follows:

--Electronic Pigging Systems, Inc.--.

Signed and Sealed this

Seventh Day of April, 1987

Attest:

DONALD J. QUIGG

Attesting Officer

Commissioner of Patents and Trademarks